Patented Aug. 10, 1943

2,326,543

UNITED STATES PATENT OFFICE 2,326,543

METHYL METHACRYLATE MOLDING COMPOSITION

Maurice L. Macht, Jersey City, N. J., assignor to E. I. du Pont de Nemours & Company, Wilmington, Del., a corporation of Delaware No Drawing. Application July 27, 1940, Serial No. 348,029

2 Claims. (Cl. 260—42)

This invention relates to molding compositions and, more particularly, to compositions comprising polymethyl methacrylate resins.

It is an object of the present invention to effect improvements in molding compounds comprising polymethyl methacrylate, particularly as regards ease of molding, toughness and form-stability. Other objects of the invention will be apparent from the description given hereinafter.

The term "moldability" is to be understood as including not merely ease of molding, i. e., the ability to be molded by compression or by injection, on short cycles, at reasonable temperatures, but also the ability to yield perfect impressions of a mold cavity and molded articles of good finish, free from visible defects of surface.

By "stability of form" is meant freedom, or comparative freedom, of molded articles from tendency to distortion of shape, or "unmolding," at temperatures between room temperature and the recognized softening temperature.

The above objects are accomplished according to the present invention by providing new molding compositions comprising a homogeneous mixture of a methyl methacrylate resin and a polyvinyl acetal resin, preferably within the proportion range of 100 parts of methyl methacrylate resin to 33–300 parts of polyvinyl acetal resin. Proportions are given by weight throughout the specification and claims unless otherwise stated.

The compositions of the present invention are not interpolymers or copolymers of a methacrylate and a polyvinyl acetal but rather homogeneous, intimate mechanical mixtures of the polymers. Such homogeneous mixtures may be produced (1) by intimate kneading together of the resins or (2) by admixture of mutually miscible solutions of the respective resins, followed by recovery of the resin mixture therefrom, or (3) by dissolving the polyvinyl acetal resin in the monomer or mixture of monomers of the methyl methacrylate resin, effecting polymerization of the latter, and kneading the resulting mixture of resins.

When the methyl methacrylate resin is separately prepared, for use in either the first or second method of making mechanical mixtures thereof with polyvinyl acetal resins, the method of preparation of the former is not a factor in the present invention. Since, however, the resin is to be subjected to kneading, it is desirable that it be produced in a fairly finely divided form and, to this end, it will be convenient to use a method of polymerization which yields the polymer in the form of small globules or granules.

The polyvinyl acetal resins as produced by present commercial processes are in a desirably finely divided form as a result of their precipitation from the reaction batch.

Complete homogenization of the mixture of the two resins is essential to the success of the invention. Either a masticator mixer, mixing rolls or a screw stuffer will give this result if the period of kneading is sufficiently prolonged and the temperature sufficiently high.

If a masticator mixer, e. g., "Banbury" mixer, is used, it may advantageously be preheated by circulation of steam or oil through its jackets. Weighed quantities of the two resins are introduced in proper amount to obtain optimum kneading action, and kneading is continued usually for between 15 and 30 minutes. The time required will depend upon such factors as the fineness of division of the resins, the relative proportions of the two resins, the temperature of operation, and the presence or absence of auxiliary ingredients such as plasticizers. For given conditions, it is desirable to establish a safe minimum period of kneading upon the basis of test moldings.

If mixing rolls are used, they should be preheated and maintained hot by the circulation of steam or oil through their cores, and one roll should preferably be maintained distinctly hotter than the other, as is customary in the rolling of plastics, in order that the mass will cling to that one roll rather than divide itself between the two rolls. Since the methyl methacrylate resin is less readily softened by heat than the polyvinyl acetal resin, it is definitely desirable to knead the former by itself until it is well softened, before the addition of the latter. Homogenization of the mixture is promoted by frequently cutting the mass from the hot roll and refeeding it. The time for homogenization in this manner is seldom as short as thirty minutes and is more frequently 45 to 60 minutes. Here again test moldings are useful in establishing the proper minimum duration of the kneading.

Satisfactory kneading may be accomplished also by the use of a tube mill or screw stuffer. The ingredients are blended together, cold, in a suitable light mixer and then fed into a screw stuffer heated to a temperature sufficiently high to ensure the required kneading and homogenization during the passage of the mixture through to the discharge end at an economical rate.

In carrying out the second method of making mechanical mixtures of methyl methacrylate resins and polyvinyl acetal resins, either the two resins are separately dissolved in solvents adapted to yield solutions which are mutually miscible or, equivalent thereto, the two resins are simultaneously dissolved in a common solvent. The mixture of resins is recovered from solution by any convenient method, of which the most generally economical is that of precipitation by addition of a non-solvent, preferably water. The mixture of resins thus recovered from solution is then kneaded, or otherwise dried and homogenized.

In following out the third method of preparing homogeneous mechanical mixtures of methyl methacrylate resins and polyvinyl acetal resins, the polyvinyl acetal resin is dissolved in the monomer or mixture of monomers of the desired methyl methacrylate resin and the latter is then subjected to polymerization, conveniently by the method already referred to which yields the polymer in the form of small globules or granules. Since the polyvinyl acetal remains, so far as is known, inactive and unaffected during the polymerization of the monomer in which it is dissolved, the result is to be regarded as a mechanical mixture. This mixed resin is now subjected to kneading for a period sufficient to complete its homogenization; this period will ordinarily be considerably less than that which is required for the effecting of homogenization of mixtures of the two resins in discrete particles.

Obviously, this third method is not completely applicable if the proportion of polyvinyl acetal resin is so large as to be not practically soluble in the monomer, or mixture of monomers, of the methyl methacrylate resin. It is practicable, however, in such cases, to dissolve part of the acetal resin in the monomer and to add the rest of it during the kneading.

The term "methyl methacrylate resin" is used herein to include both polymethyl methacrylate and copolymers of methyl methacrylate with other polymerizable compounds which copolymers are adapted for use in molding compositions and comprise methyl methacrylate in major proportion. The copolymers of methyl methacrylate with styrene or vinyl acetate are particularly important but copolymers with methyl acrylate, butyl methacrylate, and the like, are adapted for use in the present invention.

With respect to the copolymers of methyl methacrylate and styrene or vinyl acetate, those which have a ratio of 100 parts of methyl methacrylate up to about 33 parts of vinyl acetate or styrene, more preferably, 15–20 parts of vinyl acetate or styrene, are particularly valuable for use in this invention. Such copolymers and the process of making molding compounds therefrom are disclosed in copending United States patent application Serial No. 326,964 of Macht and Fletcher, filed March 30, 1940. By malaxating these copolymers to give copolymers having an average molecular weight between about 15,000 and 32,000, in accordance with the invention disclosed in said application Serial No. 326,964, a methyl methacrylate resin is obtained which can be homogeneously mixed with a polyvinyl acetal resin in accordance with the present invention to give a molding composition of particular merit.

The term "polyvinyl acetal resin" is used herein in a generic sense to include those resins derived from a polyvinyl ester by hydrolysis and condensation with either an aldehyde or a ketone.

Broadly, polyvinyl acetal resins adapted for use in the present invention include products of hydrolysis of polyvinyl acetate and concurrent or subsequent condensation with aldehydes and ketones such as formaldehyde, acetaldehyde, butyraldehyde, isobutyraldehyde or cyclohexyl aldehyde, or acetone, but the quality of the products of the present invention is best maintained by the selection of polyvinyl acetal resins of polyvinyl alcohol content not in excess of 22% and of viscosity between about 14 and about 65 centipoises. The viscosity is determined by any standard method, conveniently the falling ball method, in a solution of 5 grams of the resin in 95 cc. of ethyl alcohol (95% by volume), at 25° C.

The proportions of methyl methacrylate resin and acetal resin in mixtures made in accordance with the invention will be chosen upon consideration of the properties desired, e. g., the molding characteristics of the compound and the mechanical and thermal properties of the articles molded therefrom. In general, higher percentages of methyl methacrylate resins result in mixtures having relatively high softening temperatures and of relatively rigid character, while higher percentages of acetal resins promote toughness and decrease the tendency of a molded article to shrink or unmold as a result of heat at temperatures below the nominal softening temperature. The characteristics of the product are further modified in detail in accordance with the selections made among the several methyl methacrylate resins and among the several polyvinyl acetal resins. The compositions made in accordance with the invention tend to combine the desirable properties of their constituent resins. Since an appreciable percentage of a resin of the one type is required to effect a useful modification of the properties of one of the other type, the compositions made in accordance with the invention will ordinarily contain not less than about 25% of either of the resins, i. e., with 100 parts of methyl methacrylate resin there will be mixed from 33 to 300 parts of polyvinyl acetal resin. These limits are primarily based on practical considerations and the invention, in its broader aspects, is not limited to any particular proportions of the two types of resins.

The following examples, presented in tabulated form, illustrate specific preferred embodiments of the invention. In the heading "Acetal resin" the term "acetal" is used in its broad sense while in the actual examples it is used in its specific meaning to denote the product resulting from the condensation of hydrolyzed polyvinyl acetate with acetaldehyde.

The proportion of "methyl methacrylate resin" used in each example is 100 parts. The specific composition of the "methyl methacrylate resin," i. e., whether it is polymethyl methacrylate or a copolymer of methyl methacrylate with varying proportions of styrene or vinyl acetate, is indicated in each example under the heading "Methyl methacrylate resin composed of."

In the column under the heading "method" are letters designating the particular method used for preparing the homogeneous mixture of the methyl methacrylate resin and polyvinyl acetal resin, as follows:

A. Prolonged intimate kneading together of solid resins on mixing rolls;
B. Prolonged intimate kneading together of solid resins in a masticator mixer;
C. Prolonged intimate kneading together of solid resins in a screw stuffer;
D. Admixture of mutually miscible solutions of the resins, recovery of mixed resins therefrom, followed by kneading;
E. The polyvinyl acetal resin is dissolved in the monomer or mixture of monomers of the methyl methacrylate resin, the solution is subjected to polymerization in granular form, and the product of the polymerization kneaded on rolls.

cizers, modifiers, fillers, coloring matter, and effect materials, all of which may be added as will be appreciated by those skilled in the art.

Because the resin compositions of this invention are, in general, readily moldable, plasticizers will not ordinarily be necessary. However, plasticizers may be added either prior to polymerization of the methyl methacrylate resin or in connection with the kneading step to homogenize the molding composition. Suitable plasticizers include diethyl, dibutyl and diamyl phthalates, triethylene glycol di-(2-ethyl butyrate), dibutyl sebacate, and dimethyl sebacate.

On the other hand, a mold lubricant will, generally, be included in the composition to facilitate the molding and release of molded articles from the molds. Among the suitable lubricants are waxes, soaps, stearic acid, esters of higher aliphatic acids, and the like. The amount of lubricant will usually range between 0.5 and 4.0% of the molding composition although this range may be exceeded.

| Example No. | Methyl methacrylate resin composed of— | | | Acetal resin | Parts | Method |
|---|---|---|---|---|---|---|
| | Methyl methacrylate, parts | Styrene, parts | Vinyl acetate, parts | | | |
| 1 | 100 | | | Polyvinyl formal | 100 | A |
| 2 | 100 | | | do | 300 | C |
| 3 | 100 | | | Polyvinyl acetal | 33 | A |
| 4 | 100 | | | do | 33 | E |
| 5 | 100 | | | do | 100 | A |
| 6 | 100 | | | do | 300 | A |
| 7 | 100 | | | do | 1,000 | A |
| 8 | 100 | | | Polyvinyl butyral | 33 | A |
| 9 | 100 | | | do | 100 | A |
| 10 | 100 | | | do | 100 | E |
| 11 | 100 | | | do | 300 | D |
| 12 | 100 | | | Polyvinyl ketal of acetone | 33 | B |
| 13 | 100 | | | do | 100 | A |
| 14 | 100 | | | do | 300 | A |
| 15 | 90 | 10 | | Polyvinyl formal | 33 | D |
| 16 | 90 | 10 | | do | 300 | B |
| 17 | 90 | 10 | | Polyvinyl acetal | 300 | D |
| 18 | 90 | 10 | | Polyvinyl butyral | 33 | A |
| 19 | 90 | 10 | | do | 100 | C |
| 20 | 90 | 10 | | do | 300 | D |
| 21 | 90 | 10 | | Polyvinyl ketal of acetone | 100 | B |
| 22 | 75 | 25 | | Polyvinyl butyral | 100 | A |
| 23 | 95 | | 5 | do | 33 | A |
| 24 | 85 | | 15 | Polyvinyl formal | 33 | A |
| 25 | 85 | | 15 | do | 100 | C |
| 26 | 85 | | 15 | Polyvinyl acetal | 100 | A |
| 27 | 85 | | 15 | do | 300 | A |
| 28 | 85 | | 15 | Polyvinyl butyral | 11 | A |
| 29 | 85 | | 15 | do | 33 | A |
| 30 | 85 | | 15 | do | 67 | A |
| 31 | 85 | | 15 | do | 100 | A |
| 32 | 85 | | 15 | do | 100 | B |
| 33 | 85 | | 15 | do | 300 | A |
| 34 | 85 | | 15 | do | 900 | A |
| 35 | 85 | | 15 | Polyvinyl ketal of acetone | 100 | A |
| 36 | 75 | | 25 | Polyvinyl butyral | 33 | A |

| Example No. | Methyl methacrylate resin composed of— | | | | Acetal resin | Parts | Method |
|---|---|---|---|---|---|---|---|
| | Methyl methacrylate, parts | Butyl methacrylate, parts | Methyl acrylate, parts | Styrene, parts | | | |
| 37 | 90 | | 10 | | Polyvinyl formal | 100 | C |
| 38 | 90 | | 10 | | Polyvinyl acetal | 100 | A |
| 39 | 90 | | 10 | | Polyvinyl butyral | 33 | E |
| 40 | 90 | | 10 | | do | 100 | B |
| 41 | 90 | | 10 | | do | 300 | A |
| 42 | 90 | | 10 | | Polyvinyl ketal of acetone | 100 | C |
| 43 | 85 | | 15 | | Polyvinyl butyral | 100 | A |
| 44 | 95 | 5 | | | do | 100 | A |
| 45 | 90 | 10 | | | do | 100 | B |
| 46 | 90 | 10 | | | do | 200 | A |
| 47 | 70 | 20 | | 10 | do | 100 | A |

The above examples are merely illustrative and no mention is made of lubricants, plasti- Both polymeric 1,4-dihydronaphthalene and a mixture of alcohols of 16, 17, and, predominantly, 18 carbon atoms derived from hydrogenated coconut oil esters, such alcohol mixture being commercially designated as "C-18" alcohol, are especially suited as modifiers although the fatty alcohols of large molecular weight, in general, are adapted for use as modifiers in the herein considered compositions. The "C-18" alcohol would be used in rather small proportion as 4-8 parts per 200 parts of the mixture of resins and the polymeric 1,4-dihydronaphthalene may be used advantageously in a proportion of 35 parts per 200 parts of the mixture of resins. Both modifiers and lubricants may be incorporated during the kneading step to homogenize the composition.

Obviously, the products of the present invention may be colored by incorporation of suitable dyestuffs or pigment or both, which incorporation is readily accomplished in connection with the step of kneading. If a desirable dyestuff requires solvent for its proper incorporation, the use of such solvent in the necessary small quantity is permissible, since it will be driven off by heat before the completion of the step of kneading.

While the compositions of the present invention have been particularly described with respect to their use in molding techniques, they are, nevertheless, plastic compositions adapted for general use and are well suited for the manufacture of plastic sheeting. Sheeting may be made by calendering a solvent-free mixture after the kneading step, and then, if desired, press-polishing it or, starting with a kneaded dough made by method D above, by cake-pressing, sheeting, seasoning, and polishing.

The following examples illustrate the preparation of sheeting according to the present invention:

*Example 48.*—The mixture of Example 31, while still containing solvent, is homogenized on mixing rolls and drawn off in the form of slabs. These are united into a block by the application of heat and pressure in the manner followed with pyroxylin plastic. The block is cooled and cut into sheets, which are seasoned for removal of solvent.

*Example 49.*—The mixture of Example 30, homogenized on mixing rolls, is passed through a three-roll vertical calender, to form smooth sheeting.

Mixtures of resins made in accordance with this invention tend to combine the good properties of their constituents, and are noteworthy for their strength, their satisfactory softening temperatures, and their good dimensional stability. They are readily molded by compression or by injection.

As many apparently widely different embodiments of this invention may be made without departing from the spirit and scope thereof, it is to be understood that the invention is not limited to the specific embodiments thereof except as defined in the appended claims.

I claim:

1. A molding composition which comprises a homogeneous mixture of 100 parts of a copolymer of methyl methacrylate with up to about 33% of its weight of a compound from the group consisting of styrene and vinyl acetate, and from 33-300 parts of a polyvinyl acetal resin.

2. A molding composition which comprises a homogeneous mixture of 100 parts of a copolymer of methyl methacrylate with 15-20% of its weight of vinyl acetate, and from 33-300 parts of a polyvinyl butyral resin.

MAURICE L. MACHT.